(12) United States Patent
Chou

(10) Patent No.: US 9,298,317 B2
(45) Date of Patent: Mar. 29, 2016

(54) STRAY-LIGHT-COUPLED BIOMETRICS SENSING MODULE AND ELECTRONIC APPARATUS USING THE SAME

(71) Applicant: Bruce C. S. Chou, Hsin Chu (TW)

(72) Inventor: Bruce C. S. Chou, Hsin Chu (TW)

(73) Assignee: J-Metrics Technology Co., Ltd., Taipei (TW)

( * ) Notice: Subject to any disclaimer, the term of this patent is extended or adjusted under 35 U.S.C. 154(b) by 70 days.

(21) Appl. No.: 14/104,608

(22) Filed: Dec. 12, 2013

(65) Prior Publication Data

US 2014/0168167 A1 Jun. 19, 2014

(30) Foreign Application Priority Data

Dec. 19, 2012 (TW) .............................. 101148214 A

(51) Int. Cl.
*G06F 3/042* (2006.01)
*G06K 9/00* (2006.01)

(52) U.S. Cl.
CPC ............ *G06F 3/042* (2013.01); *G06K 9/00026* (2013.01); *G06K 2009/0006* (2013.01)

(58) Field of Classification Search
CPC .................................. G06F 21/32; G06F 3/042
See application file for complete search history.

(56) References Cited

U.S. PATENT DOCUMENTS

| | | | |
|---|---|---|---|
| 5,446,290 A | 8/1995 | Fujieda et al. | |
| 6,337,918 B1 * | 1/2002 | Holehan | G06F 1/1616 345/175 |
| 6,688,186 B2 * | 2/2004 | Chae | 73/862.624 |
| 7,852,417 B2 * | 12/2010 | Abileah | G06F 3/042 349/12 |
| 2003/0174870 A1 * | 9/2003 | Kim et al. | 382/124 |
| 2004/0022421 A1 * | 2/2004 | Endoh | G06F 3/021 382/115 |
| 2006/0017862 A1 * | 1/2006 | Song et al. | 349/42 |
| 2006/0078176 A1 * | 4/2006 | Abiko et al. | 382/124 |
| 2008/0148058 A1 * | 6/2008 | Hill | G06F 21/32 713/186 |
| 2010/0007632 A1 * | 1/2010 | Yamazaki | 345/175 |
| 2010/0061040 A1 * | 3/2010 | Dabov | G06F 1/1626 361/679.01 |
| 2010/0096710 A1 * | 4/2010 | Chou | 257/414 |
| 2010/0321158 A1 * | 12/2010 | Setlak et al. | 340/5.83 |
| 2011/0267298 A1 * | 11/2011 | Erhart et al. | 345/173 |
| 2011/0285642 A1 * | 11/2011 | Lee et al. | 345/173 |
| 2012/0242635 A1 * | 9/2012 | Erhart | G06F 1/1626 345/207 |
| 2012/0306815 A1 * | 12/2012 | Su | G06F 3/042 345/175 |
| 2013/0136317 A1 * | 5/2013 | Shinzaki | G06K 9/00885 382/115 |
| 2013/0287272 A1 * | 10/2013 | Lu et al. | 382/124 |
| 2014/0140588 A1 * | 5/2014 | Chou | G06K 9/0002 382/124 |

* cited by examiner

*Primary Examiner* — Claire X Pappas
*Assistant Examiner* — Robert Stone
(74) *Attorney, Agent, or Firm* — Muncy, Geissler, Olds & Lowe, P.C.

(57) ABSTRACT

A stray-light-coupled biometrics sensing module includes a light-transparent body, a display unit and an optical module. The light-transparent body has a front side and a backside. The front side is configured to support an organic object thereon. The display unit attached to the backside of the light-transparent body displays a frame. The optical module is attached to the backside of the light-transparent body through an adhesive, and is disposed adjacent to the display unit. First light rays of the frame emitted from an eye-viewing screen couple into the organic object through the light-transparent body. After travelling a short distance in the organic object, the first light rays couple out of the organic object and re-enter the light-transparent body as second light rays entering the optical module. The optical module senses the second light rays to generate a biometrics image signal. An electronic apparatus is also disclosed.

14 Claims, 13 Drawing Sheets

STRAY-LIGHT-COUPLED BIOMETRICS SENSING MODULE AND ELECTRONIC APPARATUS USING THE SAME

This application claims priority of No. 101148214 filed in Taiwan R.O.C. on Dec. 19, 2012 under 35 USC 119, the entire content of which is hereby incorporated by reference.

BACKGROUND OF THE INVENTION

1. Field of the Invention

The invention relates to a stray-light-coupled biometrics sensing module and an electronic apparatus using such biometrics sensing module.

2. Related Art

Recently, portable mobile apparatuses, such as mobile phones, tablet computers and the like, are developed in rising manners and have become indispensable appliances in the life. More particularly, with the development of the network and the electronic commerce requirement, the mobile phone may further be integrated with an authentication function, representing the personal identification, such as that of an electronic identification card, an electronic passport, a consumable chip card and the like. Therefore, in addition to the conventional digital password authentication, it is a future development direction to enhance the software/hardware function of the personal identification authentication according to the biometrics information (e.g., fingerprint) of the human body. The conventional biometrics information includes the fingerprint, palmprint, iris, vein, face and the like. Based on the device price, the difficulty in use and the characteristic stability, the fingerprint identification method is always the most popular method.

The conventional fingerprint sensors are mainly classified into a capacitive sensor and an optical sensor, wherein the maximum drawback of the capacitive sensor is that it cannot be used to sense the wet finger or the sensing surface with the liquid. In addition, this capacitive fingerprint sensor is embedded into an opening of the housing of the electronic apparatus. So, the outlook of the electronic apparatus is affected, and the dust and dirtiness may be left in the gap between the sensor module and the electronic apparatus, and the outlook is further deteriorated.

FIG. 1 shows a frequently seen optical fingerprint sensor 500, which works according to the total reflection principle of light between a fingerprint FP and an optical surface plane (usually a surface plane 512 of a prism 510) in contact with the fingerprint FP, so that a fingerprint image is constructed on an image sensor 530. This sensing principle has the maximum drawback that the dry finger cannot be sensed to have the good continuity texture image, so that the misreading problem occurs when the minutia points are being extracted. Meanwhile, it is also necessary to provide a collimated light source 520 emitting light for the total reflection principle. This also increases the cost and the design complexity.

SUMMARY OF THE INVENTION

It is therefore an object of the invention to provide a stray-light-coupled biometrics sensing module and an electronic apparatus using the same so that the above-mentioned problems can be overcome and the optical fingerprint sensing can be effectively achieved using a light source of a display.

To achieve the above-identified object, the invention provides a stray-light-coupled biometrics sensing module including a light-transparent body, a display unit and an optical module. The light-transparent body has a front side and a backside, wherein the front side is configured to support an organic object thereon. The display unit is attached to the backside of the light-transparent body and displays a frame. The optical module is attached to the backside of the light-transparent body through an adhesive, and is disposed adjacent to the display unit. First light rays of the frame couple into the organic object through the light-transparent body. After travelling a short distance in the organic object, the first light rays couple out of the organic object and become second light rays, which enter the optical module through the light-transparent body. The optical module senses the second light rays to generate a biometrics image signal.

The invention also provides an electronic apparatus including a casing, a mainboard disposed in the casing and the stray-light-coupled biometrics sensing module connected to the casing. The display unit and the optical module are electrically connected to the mainboard.

With the aspects of the invention, it is possible to provide a stray-light-coupled biometrics sensing module and an electronic apparatus using the same, wherein the outlook of the electronic apparatus cannot be affected by the optical sensing module, and the user would not feel the depression or gap caused by the opening formed on the electronic apparatus when he or she is using the electronic apparatus. Using the optical fingerprint sensor to work in conjunction with the light source of the display can obtain the better sensing effect without additionally providing the light source for the optical fingerprint sensor. Consequently, it is possible to utilize the display to provide different wavelengths of light rays for the sensing of the stray-light-coupled biometrics sensing module.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The invention is to eliminate the drawbacks of the capacitive and the conventional optical fingerprint sensing methods. First, the sensor is hidden to provide a beautiful design ID and overcome the problem of sensing the wet finger. Second, the stray light sensing principle is adopted to replace the conventional total reflection principle of the collimated light and to serve as the optical sensing basis to overcome the problem of sensing the dry finger. Third, the sensing module does not have the light source, so that the complexity and difficulty in design are decreased.

Figure 1:
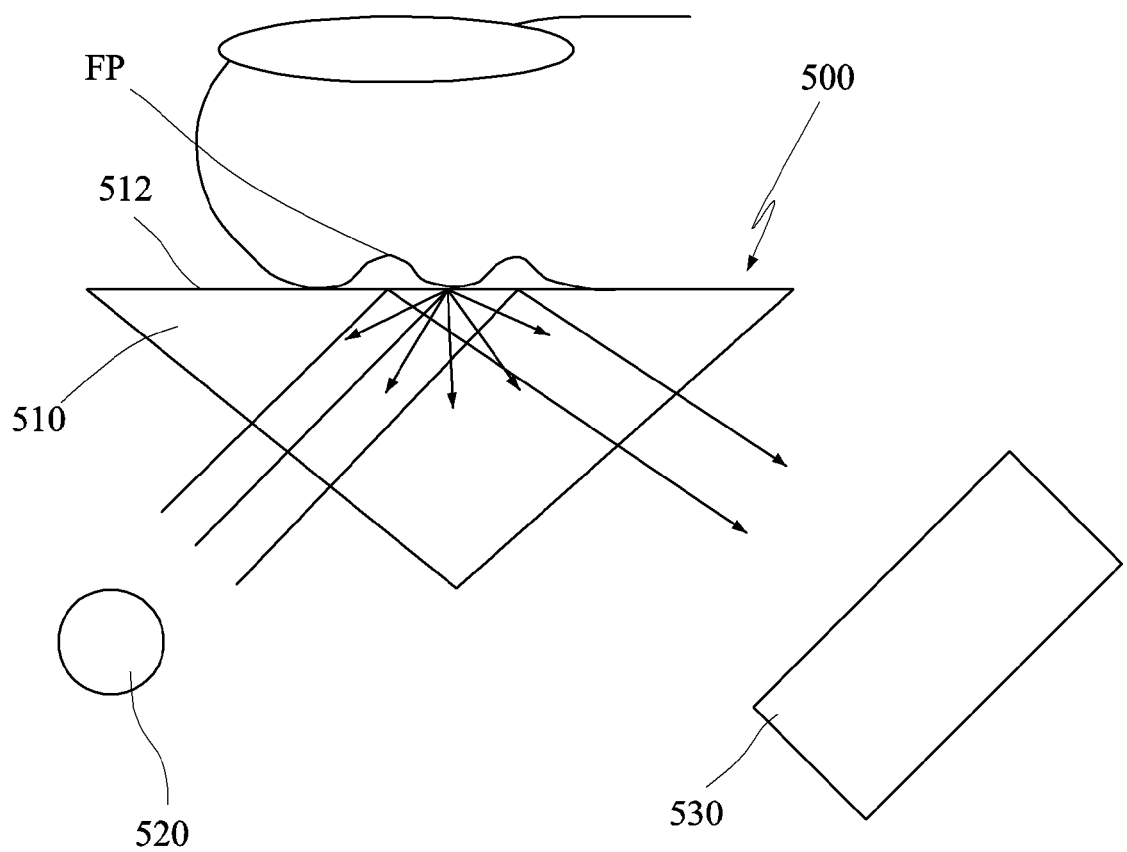
FIG. 1 is a schematic illustration showing a conventional optical fingerprint sensor.
Figure 2A:
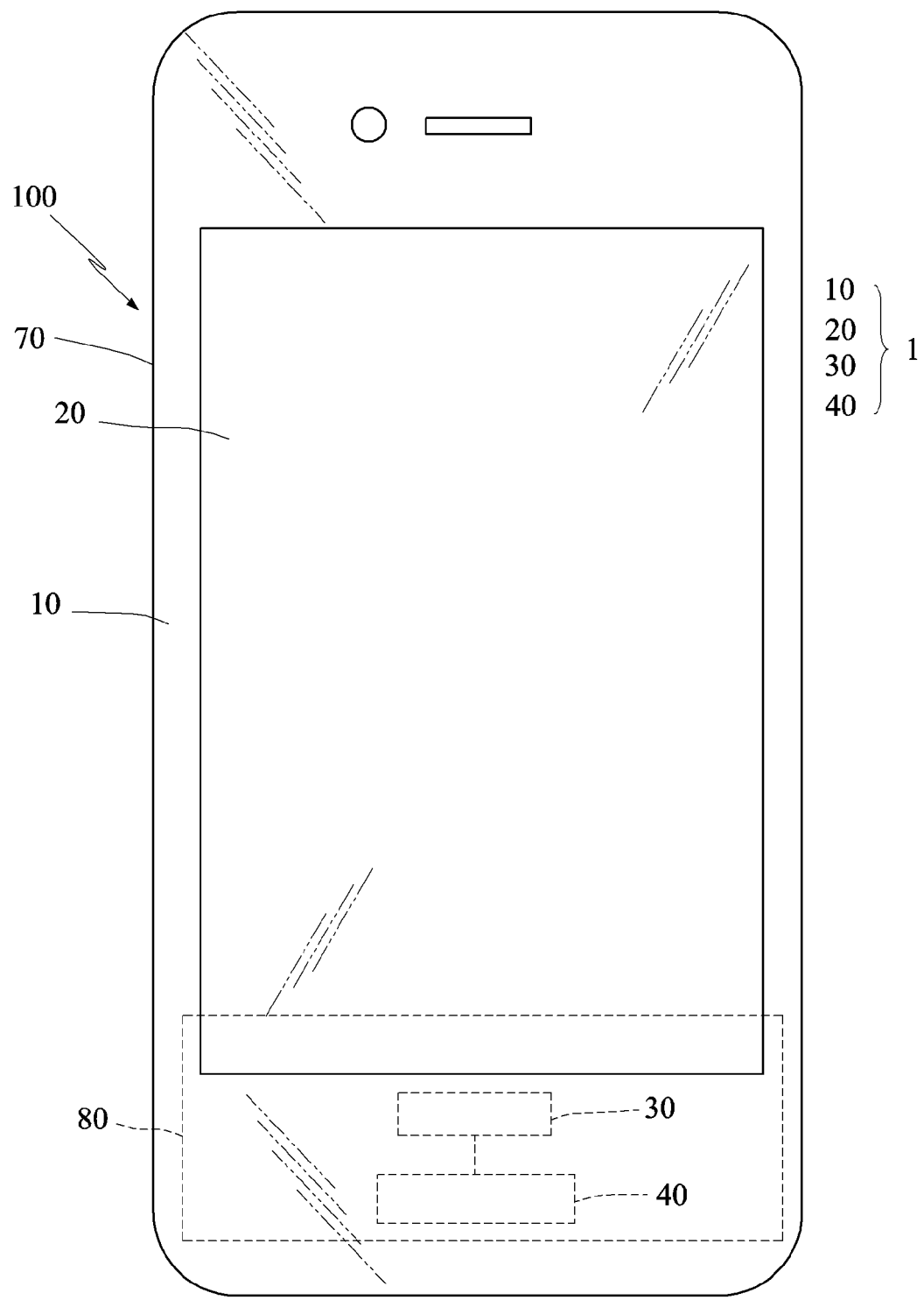
FIGS. 2A to 2C show outlooks of electronic apparatuses of three examples according to a preferred embodiment of the invention.
Figure 2B:
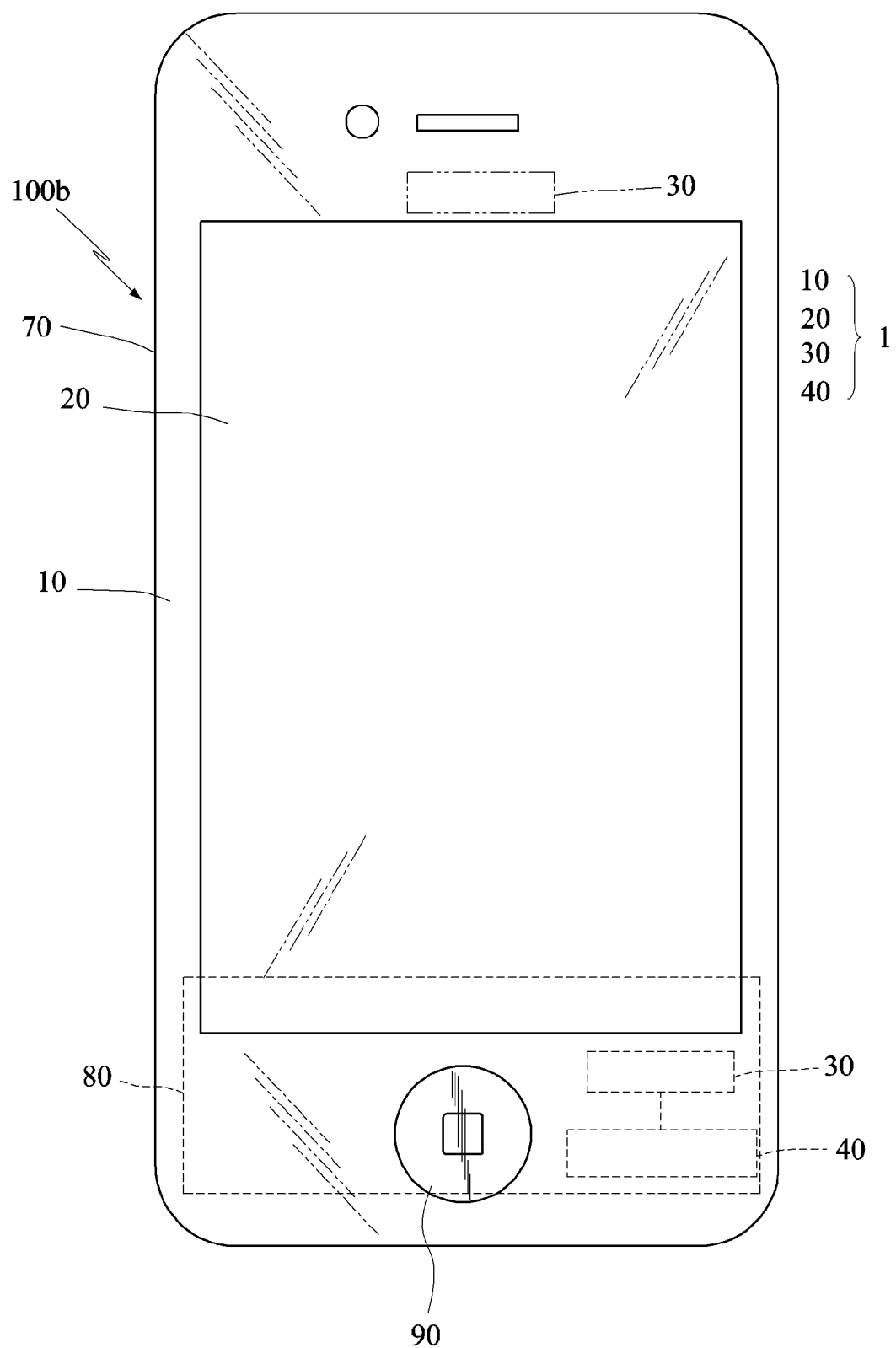
Figure 2C:
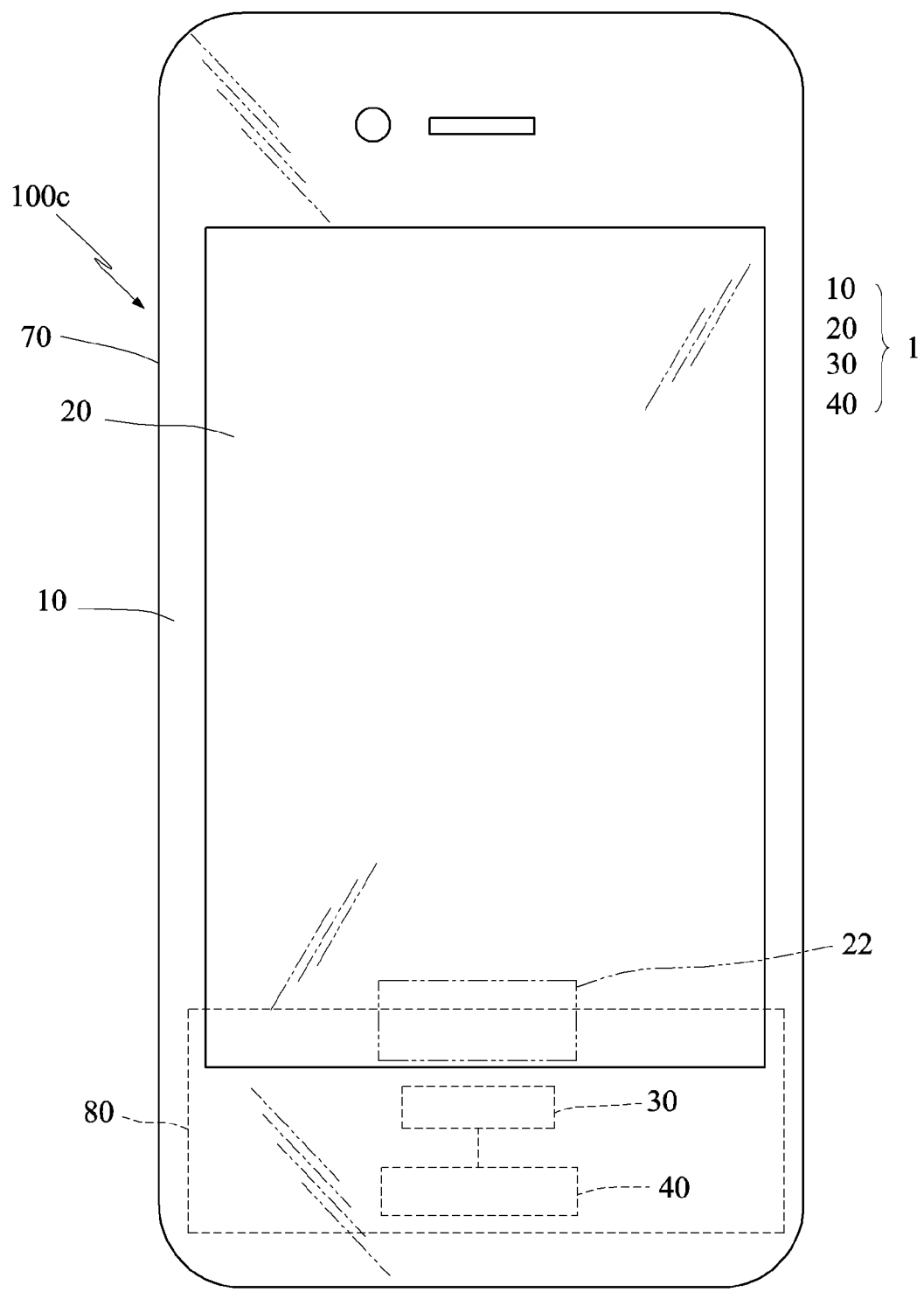

FIGS. 2A to 2C show outlooks of electronic apparatuses of three examples according to a preferred embodiment of the invention. As shown in FIG. 2A, the electronic apparatus 100 of this example is a mobile phone (e.g., smart phone). However, the invention is not particularly restricted thereto, and the invention may be applied to other electronic apparatuses, such as a tablet computer and the like. The electronic apparatus 100 includes a casing 70, a mainboard 80 and a stray-light-coupled biometrics sensing module 1. The casing 70 is the outermost structure of the electronic apparatus 100 and is also the structure that can be held by the user's hand. Many components are disposed inside the casing 70. For example, the components, such as the mainboard 80, a camera lens (not shown), a battery (not shown) and the like, are disposed in the casing 70.

The stray-light-coupled biometrics sensing module 1, disposed in the casing 70 and attached to the casing 70, includes a light-transparent body 10, a display unit 20 and an optical module 30. It is to be noted that the sensing module 1 may further include a control processing unit 40. The control processing unit 40, the display unit 20 and the optical module 30 are electrically connected to the mainboard 80, which controls the operations of the display unit 20, the optical module 30 and the control processing unit 40.

The light-transparent body 10 covers over the casing 70, and may also be regarded as a portion of the casing 70 to protect the components, such as the display unit 20, the optical module 30, the control processing unit 40 and the like, disposed therebelow. Of course, the light-transparent body in this embodiment is mainly the outermost transparent housing of the display.

The example of FIG. 2B is similar to that of FIG. 2A except that the electronic apparatus 100b further includes a button 90, and the optical module 30 and the control processing unit 40 are moved from the middle to the right side. In addition, the optical module 30 may also be disposed on the top side, left side or right side of the display unit 20 as long as the optical module 30 is disposed beside the display unit 20 and can utilize the light rays of the display unit 20. The electronic apparatus 100b has the outlook and the operation method of the currently used mobile phone, and also provides the optical fingerprint sensing function. Alternatively, the optical module 30 may be combined with the button 90 to provide the sensing and button functions, which will be described later.

The example of FIG. 2C is similar to that of FIG. 2A except that the screen or display of the electronic apparatus 100c includes a bright region 22. This bright region and other regions have the same brightness during the ordinary frame displaying. However, when the sensing mode is entered, the brightness of the bright region is enhanced. That is, the brightness of the bright region is higher than that of the rest of the display (i.e., that of a region other than the bright region), so that the stronger light rays may be provided to couple the stray light to the finger, and the sensor may also have the good sensing effect. The size of the bright region 22 may be adjusted according to the design requirement, and the design of the bright region 22 may decrease the power consumption in the fingerprint sensing mode. Of course, the bright region 22 and the other regions do not display any light ray or pattern in the power sleep mode.

Figure 3A:
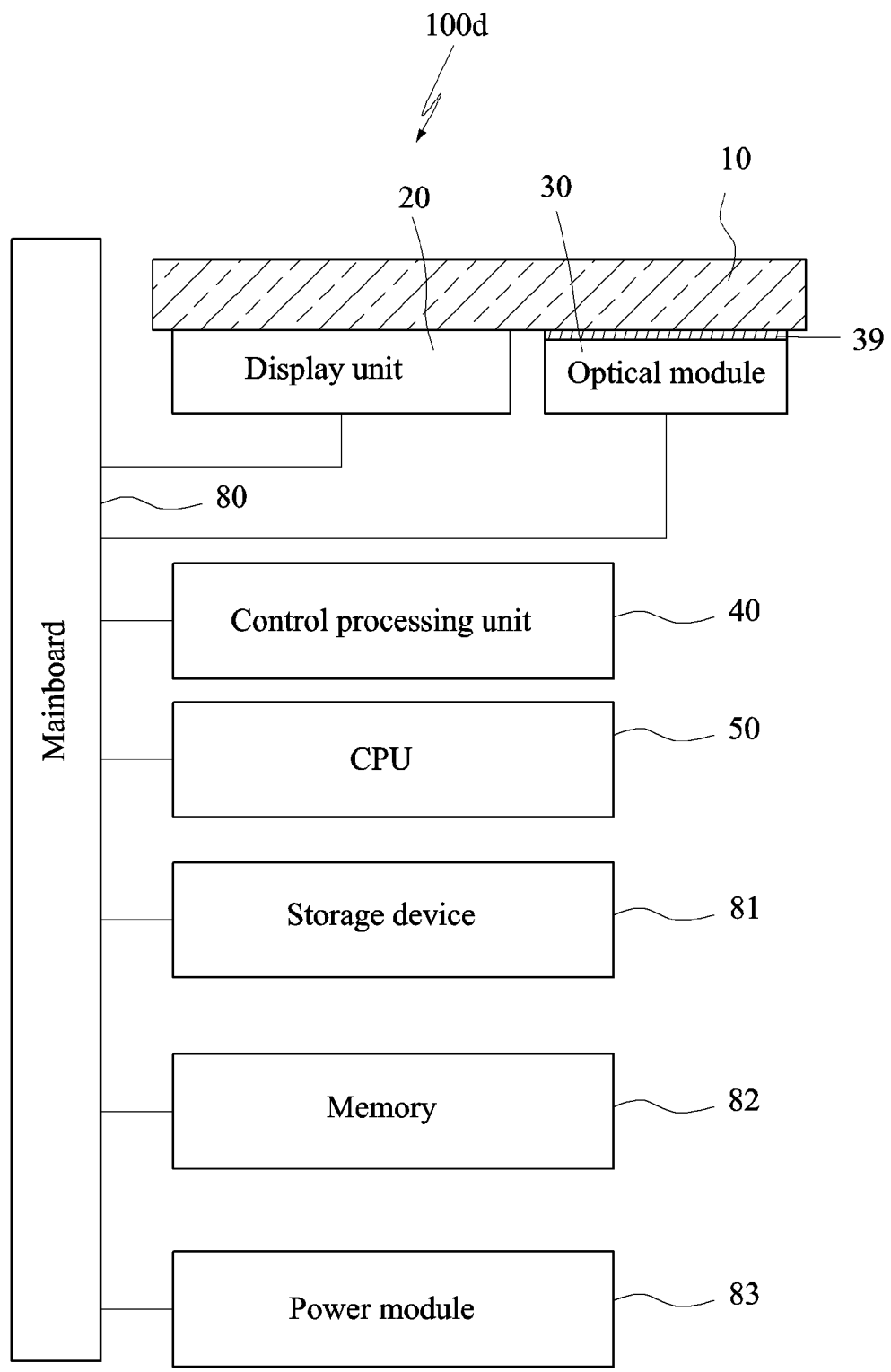
FIGS. 3A and 3B are block diagrams showing electronic apparatuses of two examples according to the preferred embodiment of the invention.
Figure 3B:
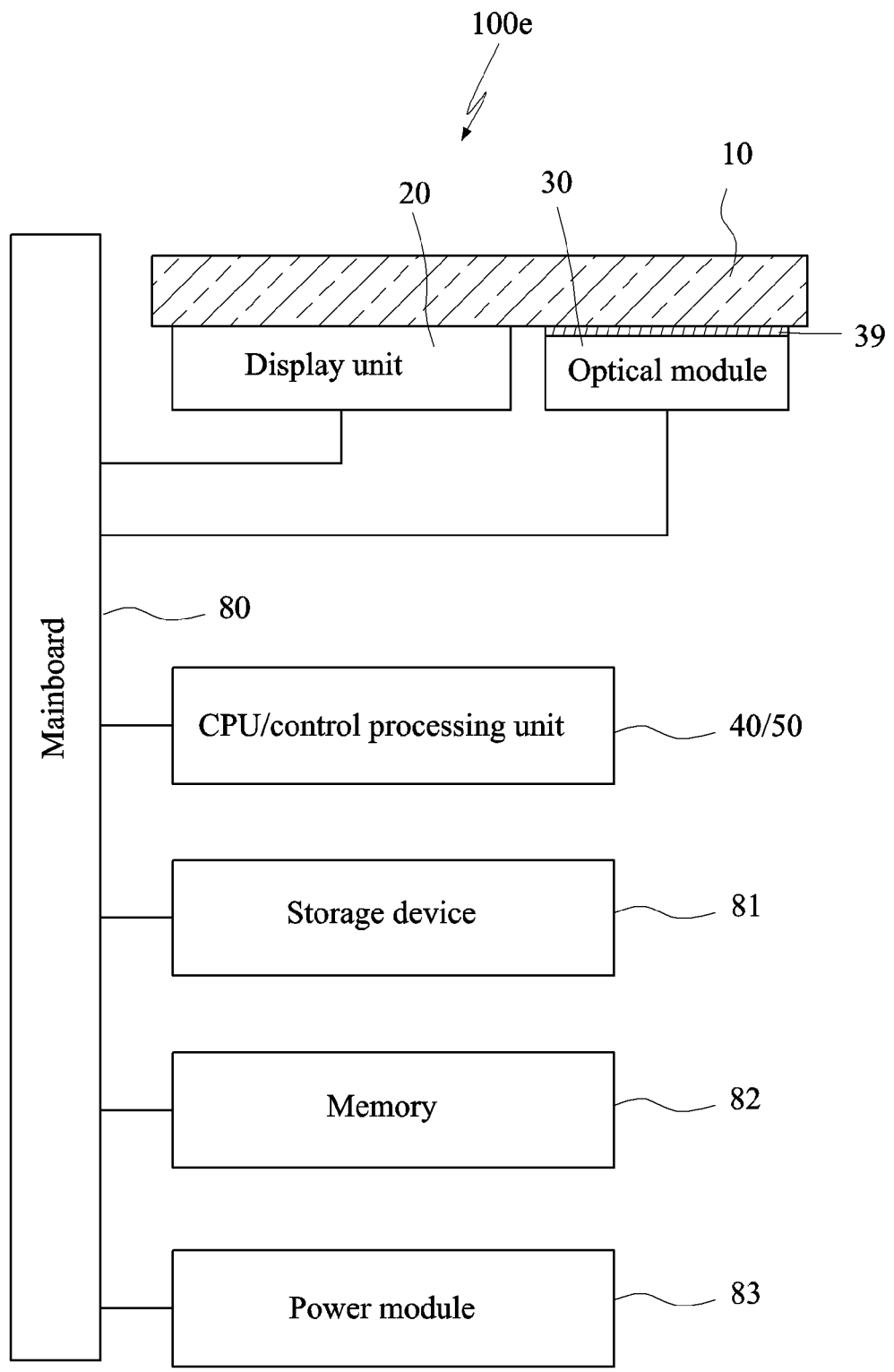

FIGS. 3A and 3B are block diagrams showing electronic apparatuses of two examples according to the preferred embodiment of the invention. As shown in FIG. 3A, the electronic apparatus 100d of this example may be applied to the electronic apparatus 100, 100b or 100c. The display unit 20 and the optical module 30 are disposed below the light-transparent body 10, and the electronic apparatus 100d may further include a central processing unit (CPU) 50, a storage device 81, a memory 82 and a power module 83. The CPU 50, electrically connected to the mainboard 80, controls the operation of the control processing unit 40. The storage device 81, electrically connected to the mainboard 80, stores data, such as the user's basic data, program files and the like. The storage device may be a non-volatile memory, such as a flash memory. The memory 82, electrically connected to the mainboard 80, temporarily stores data to be temporarily accessed by the CPU 50 upon operation. The power module 83, such as a rechargeable battery or primary battery, is electrically connected to the mainboard 80 and provides the power. The memory 82 may be a conventional dynamic random access memory (DRAM).

The electronic apparatus 100e of FIG. 3B is similar to the electronic apparatus 100d of FIG. 3A except that the CPU and the control processing unit are integrated together so that the numbers of components and electric contact points can be decreased, and the complexity in assembling can be simplified. Alternatively, the control processing unit and the sensor in the optical module may be integrated together to form a single chip.

Figure 4A:
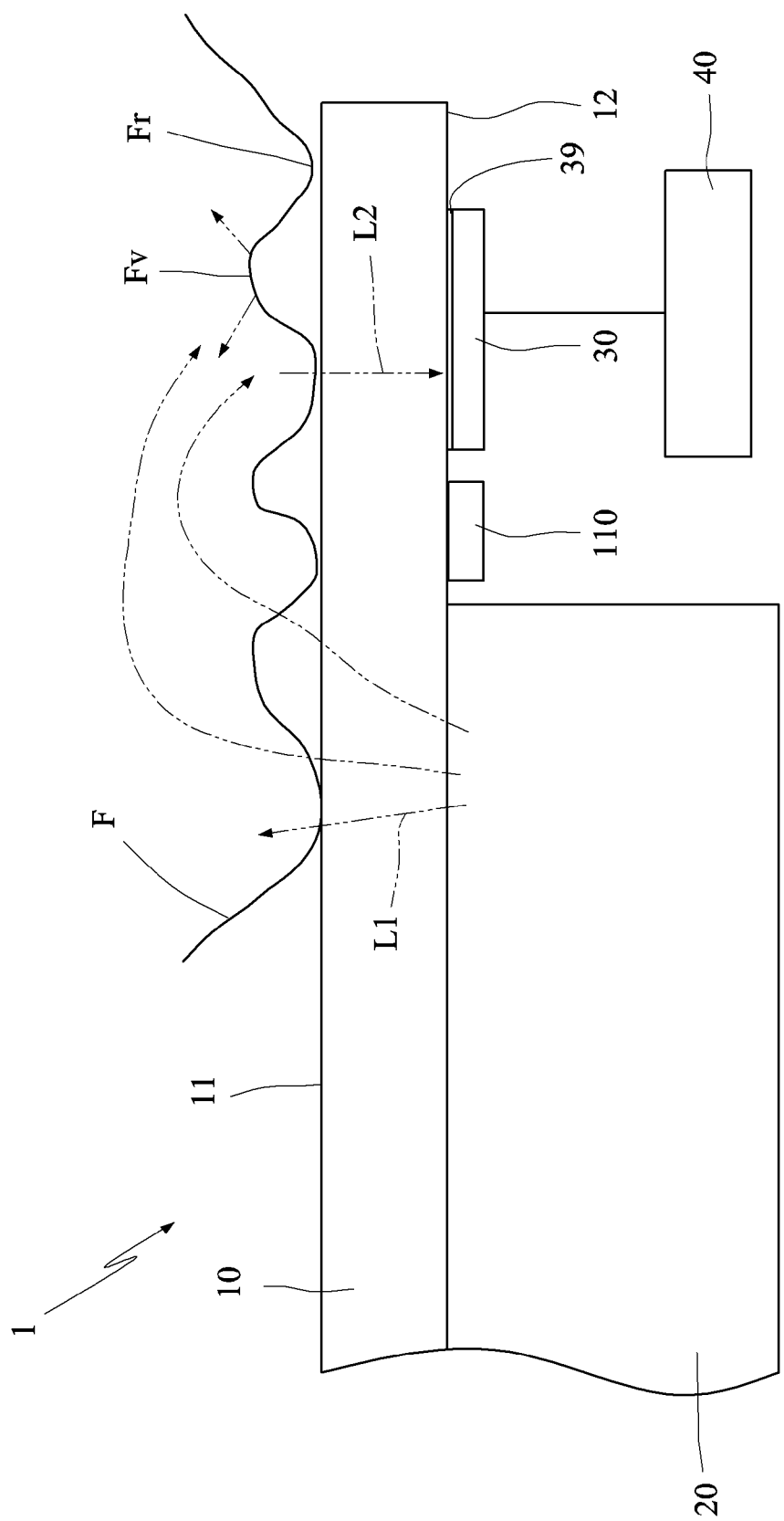
FIG. 4A is a schematic illustration showing a stray-light-coupled biometrics sensing module according to a first embodiment of the invention.

FIG. 4A is a schematic illustration showing a stray-light-coupled biometrics sensing module 1 according to a first embodiment of the invention. As shown in FIG. 4A, the light-transparent body 10 has a front side 11 and a backside 12, and the front side 11 is configured to support an organic object F, such as a finger, thereon.

The display unit 20 is a liquid crystal display unit, an organic light-emitting diode display unit, or other types of flat panel displays. The display unit 20 is attached to the backside 12 of the light-transparent body 10 and displays a frame. This frame provides a message to the user or provides an interface to be interacted with the user, and may have any simple or complicated pattern. In the sensing mode, the frame is preferably a frame with the uniformly distributed light.

The optical module 30 is attached to the backside 12 of the light-transparent body 10 through an adhesive 39, and is disposed adjacent to the display unit 20 to enhance the light coupling efficiency. In the sensing mode, first light rays L1 of the display frame (eye viewing screen) couple into the organic object (e.g., finger) F through the light-transparent body 10. After travelling a short distance, the first light rays L1 couple out of the organic object and arrive at the location above the optical module, and couple out of the organic object F through the light-transparent body 10 and become second light rays L2, which enter the optical module 30 through the light-transparent body 10. The optical module 30 senses the second light rays L2 to generate a biometrics image signal. The details of the light coupling principle will be described in the following.

The first light rays L1 couple into the finger F from the display unit 20. When the light couples out of the skin of the finger F, the ridge Fr of the finger F directly contacts with the light-transparent body 10 (e.g., glass), and the optical medium continuity (the ridge Fr and the glass have the closer refractive index) makes the light, coupling out of the ridge Fr and entering the light-transparent body 10, have the higher intensity (that is, the second light rays L2 coupled out of the ridge Fr have the higher intensity). On the other hand, the valley Fv of the finger F directly contacts with the air, and the difference between the refractive index of the finger skin and that of the air is larger. So, the light is scattered at the valley Fv interface (a portion of the light is totally reflected), and the light cannot be easily coupled out of the valley Fv. Moreover, the second light rays L2 coupled out of the valley Fv are partially reflected by the outer surface of the light-transparent body 10, and the intensity of the light entering the light-transparent body 10 is further reduced. Thus, the intensities of the light, emitted from the neighboring ridge and valley and entering the light-transparent body, are different. Therefore, the optical module 30 can distinguish the light intensity variation between the ridge and the valley according to this principle, so that a fingerprint image is generated according to the gray-level-imaging principle. Compared with the prior art, in which the total reflection principle is utilized as the fingerprint sensing principle, the stray light coupling principle utilized by the invention is based on the light intensity distribution outputted from the neighboring ridge and valley after the light couples to the ridge and valley. Thus, even if the dry finger is sensed, the contact point between the ridge and the light-transparent body also has the good light intensity distribution, so that the incapability of obtaining the good image based on the conventional total reflection principle can be avoided. Furthermore, another feature of the invention is to utilize the stray light of the screen (display) as the light source. So, the significant feature is that the cost can be saved, and that different colors of light rays of the screen can serve as the sensing modulation. For example, the light (red light) with the long wavelength cannot be easily absorbed by the skin, and the light (blue light) with the short wavelength can only go through the skin's surface layer. As a result, when the red light is used, for example, the information of the skin's surface layer can be obtained, and even the image of the vein (especially the image of the larger vein) beneath the skin of the finger can be obtained, so that the messages of the fingerprint image and the finger vein image can be provided at the same time. That is, the image signal may include the messages of the fingerprint image and the finger vein image, so that the hybrid biometrics information judgement can be achieved. Of course, in order to achieve the broader sensing wavelength in this embodiment of the invention, an invisible light source (e.g., infrared light source) 110 may also be disposed beside the optical module 30 in addition to the visible light of the display screen. In this case, the invisible light provided couples into the organic object F directly contacting with the light-transparent body 10 so that the selectivity of the sensing function is increased. For example, the information, such as the blood oxygen concentration, can be sensed, so that the biometrics message sensing function extends over the conventional fingerprint image sensing function, and a multi-message sensor device can be provided to achieve the more precise sensing. That is, the low false acceptance rate (FAR) and the low false rejection rate (ERR) can be obtained, and the anti-fake function for determining the fake finger can be provided.

The control processing unit 40 is electrically connected to the display unit 20 and the optical module 30, and controls the operations of the display unit 20 and the optical module 30. Detailed descriptions thereof will be described in the following.

The so-called hidden sensor represents that no opening is formed on the housing of the electronic apparatus. Alternatively, although the light-transparent body 10 has the light-transparent property, a coating layer, through which the specific wavelength of light can go through, may also be formed on the surface of the optical module 30 so that the user cannot easily see the optical module 30. Meanwhile, in order to achieve the good optical quality, the adhesive 39, having the good light transparent property and the refractive index close to or equal to the refractive index of the light-transparent body 10, is provided between the optical module 30 and the light-transparent body 10 (the glass is usually used). In this invention, a combination of one portion of the light-transparent body 10 and a combination of the optical module 30 constitute the structure of the invention, and the stray light of the display unit (screen) contacts with the finger through a portion of the light-transparent body 10 to couple the light into the finger. The coupled light travels a short distance in the finger and then arrives at the location above the optical sensing module, and the scattering occurs on the skin's surface layer so that the ridge contacting with the light-transparent body 10 can couple more light rays (with the higher intensity) to re-enter the light-transparent body 10, and to transmit to the optical module 30 disposed therebelow. The light-transparent body 10 achieves the two light couplings, which occur at the neighboring positions of the light-transparent body 10.

Figure 4B:
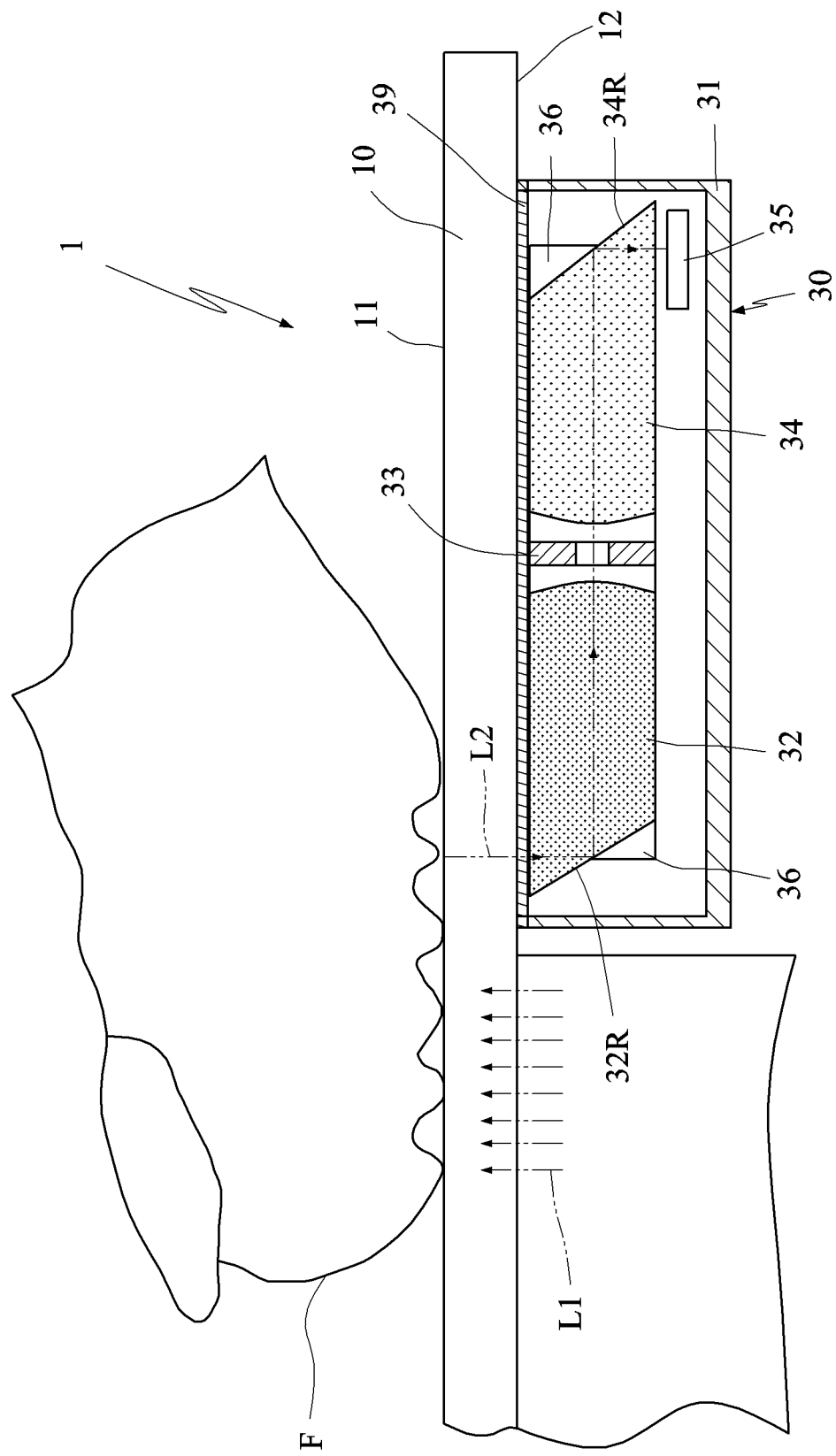
FIG. 4B is a schematic detailed view showing an optical module of the stray-light-coupled biometrics sensing module according to the first embodiment of the invention.

FIG. 4B is a schematic detailed view showing the optical module 30 of the stray-light-coupled biometrics sensing module according to the first embodiment of the invention, wherein the invisible light source 110 is not shown. Referring to FIG. 4B, the optical module 30 includes a housing 31, and a first waveguide 32, a second waveguide 34 and an optical image sensor 35, all of which are disposed in the housing 31. The first waveguide 32 and the second waveguide 34 are connected and fixed together by a connecting element 36. The second light rays L2 sequentially pass through the first waveguide 32 and the second waveguide 34, and enter the optical image sensor 35 so that the biometrics image signal is generated. The optical image sensor 35 may be a charge-coupled device (CCD) image sensor, a complementary metal oxide semiconductor (CMOS) image sensor or the like. The first waveguide 32 and the second waveguide 34 may be solid waveguides, or hollow waveguides, and will not be particularly restricted. The first waveguide 32 has a reflective surface 32R, the second waveguide 34 has a reflective surface 34R, and the reflective surface 32R/34R can turn the travelling direction of the light rays by 90 degrees, for example, for the purpose of optical layout.

Figure 4C:
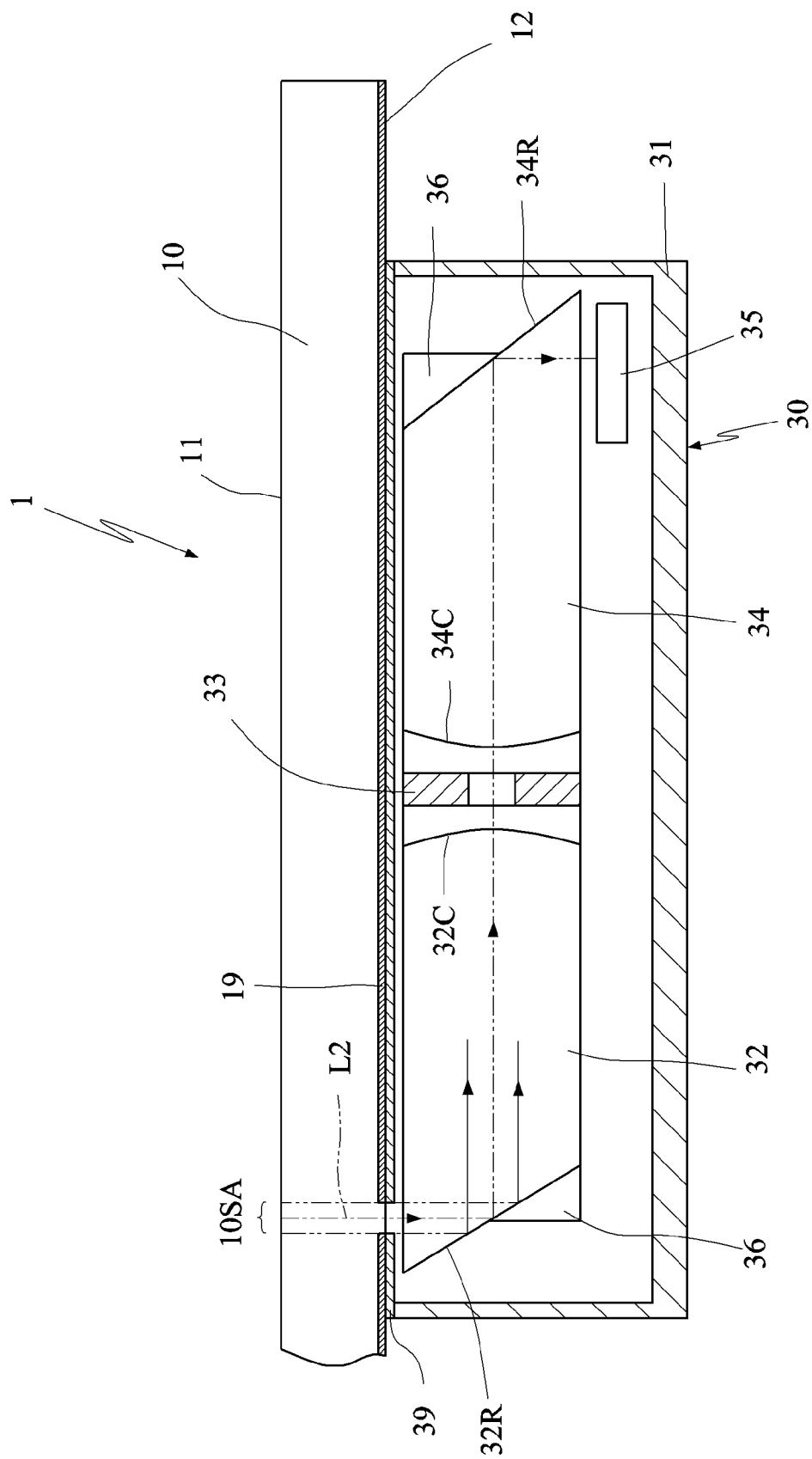
FIG. 4C is a schematic illustration showing a sensing area of FIG. 4B.

If the optical module of the invention is to be applied to a smart mobile phone, for example, the thickness of the optical module has to be restricted to 1 mm, for example. Thus, the thickness of the parallel combination of the first waveguide 32 and the second waveguide 34 is only several hundreds of microns, and corresponds to the length of the sensing area 10SA on the light-transparent body, as shown in the schematic illustration of FIG. 4C showing the sensing area 10SA of FIG. 4B. As shown in FIG. 4C, the length of the sensing area 10SA on the light-transparent body 10 in the horizontal direction in the drawing must correspond to at least two sensing members (the horizontal direction in the drawing) of the optical image sensor 35 so that the sweep-type sensor can work normally. Thus, if the fingerprint sensing resolution is requested to reach "x" dots per inch (dpi) in the lengthwise direction of the length of the sensing area 10SA, for example, then the length of the sensing area 10SA must reach (2.54/x)*2 centimeters (greater than or equal to (2.54/x)*2 centimeter). Thus, if the resolution is 500 dpi, than the length of the sensing area 10SA must be greater than or equal to 101.6 microns (um); and if the resolution is 300 dip, then the length of the sensing area 10SA must be greater than or equal to 169.3 microns (um). The length of the sensing area 10SA in this invention is equal to the thickness of the first waveguide 32 (because the reflective surface 32R is inclined by 45 degrees). Thus, according to the thin and light requirements of the electronic device, the invention is preferably applied to the sweep-type sensor. Although the non-sweep-type sensor may be used, the thickness (the vertical dimension) of the optical module 30 has to be increased. If the electronic device is allowed to have the thicker optical module, the non-sweep-type area sensor would be another embodiment of the invention.

In addition, the inner surface of the light-transparent body 10 in FIG. 4C is formed with an opaque black paint layer 19, which is disposed outside the sensing area 10SA to prevent the stray light of the non-sensing area from entering the optical image sensor 35 to cause the interference. Furthermore, a combination of a curved surface 32C of the first waveguide 32 and a curved surface 34C of the second waveguide 34 is equivalent to a physical lenticular lens to achieve the converging and focusing effects. The optical module 30 of the embodiment of the invention may further include a pupil 33, which is disposed between the first waveguide 32 and the second waveguide 34 and functions to filter out the stray light of the non-sensing signal so that the optical image sensor 35 has the better sensing quality. In this case, the second light rays L2 sequentially pass through the first waveguide 32, the pupil 33 and the second waveguide 34, and then enter the optical image sensor 35 so that the biometrics image signal is generated.

Figure 4D:
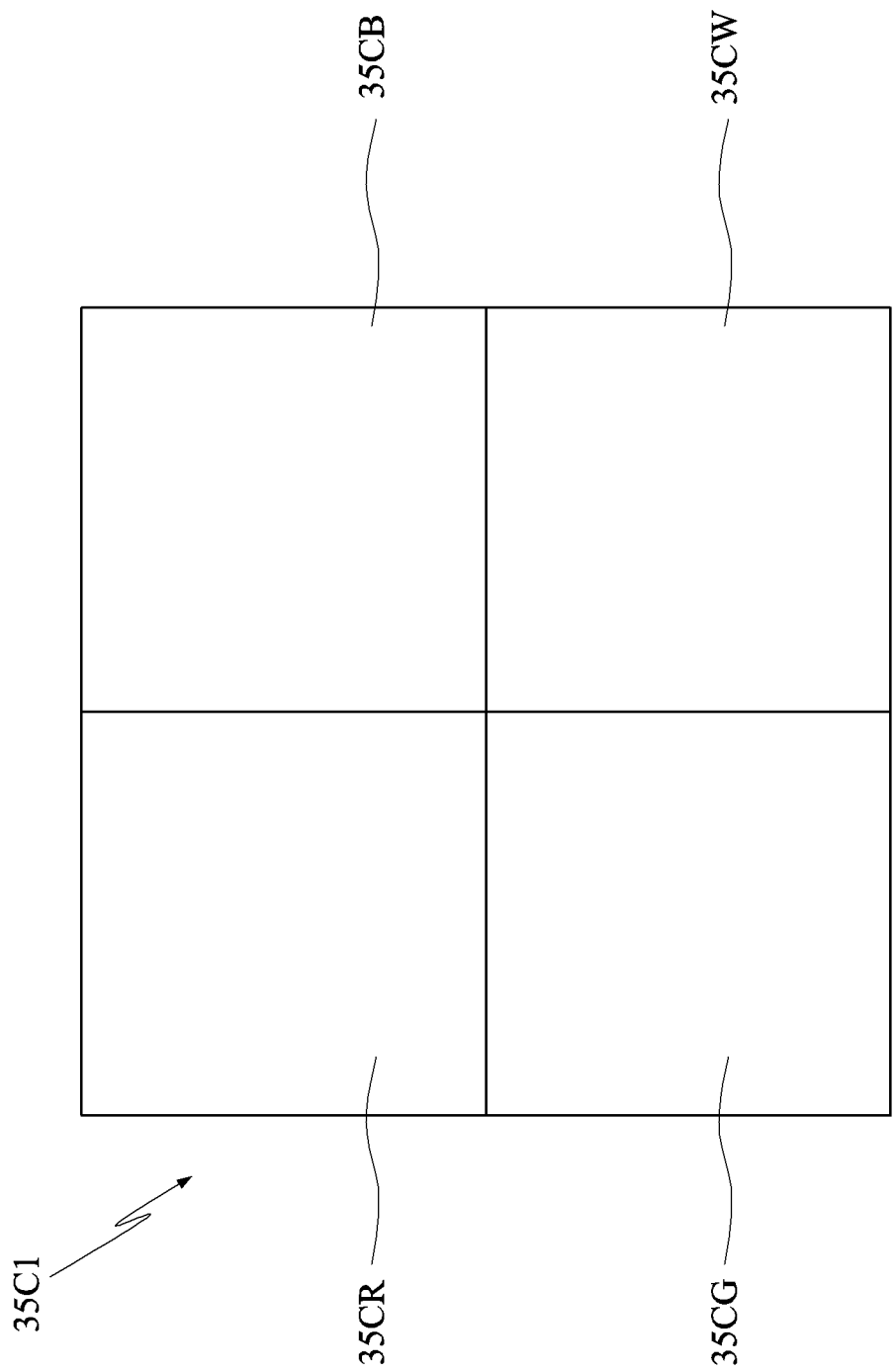
FIG. 4D is a schematic illustration showing a sensing member of an optical image sensor of FIG. 4B.

There are many ways of implementing the control processing unit 40. In one example, the control processing unit 40 controls the display unit 20 to display multiple frames, and the optical module 30 generates multiple image signals according to different wavelengths of light rays of the frames, respectively. For example, the control processing unit 40 controls the display unit 20 to display the red, orange, yellow, green, blue, indigo and purple frames, so that the input first light rays L1 are in the form of red, orange, yellow, green, blue, indigo and purple light. Different sensing results are obtained using different colors of light rays coupling into and out of the finger. After these sensing results are obtained, the control processing unit 40 can select one image signal from the image signals as the biometrics image signal. Alternatively, the control processing unit 40 can perform optimization and mutual compensation on the image signals to generate the biometrics image signal. Because the fingers from different persons or in different conditions have different reactions with different wavelengths of light rays, the method of the invention can comprehensively utilize various wavelengths of light rays to perform the sensing. The speed of switching between the light rays may be configured to be very fast, so that the user needs not to slide the finger multiple times. Consequently, as shown in FIG. 4D, one sensing member 35C1 of the optical image sensor 35 of the invention is further divided into four sub-sensing members (sub-cell) 35CR, 35CG, 35CB and 35CW for sensing different light rays, such as the red light, green light, blue light and white light, respectively. Thus, different spectrums of messages can be obtained at the same time by reading the different sub-sensing members, respectively.

Figure 5:
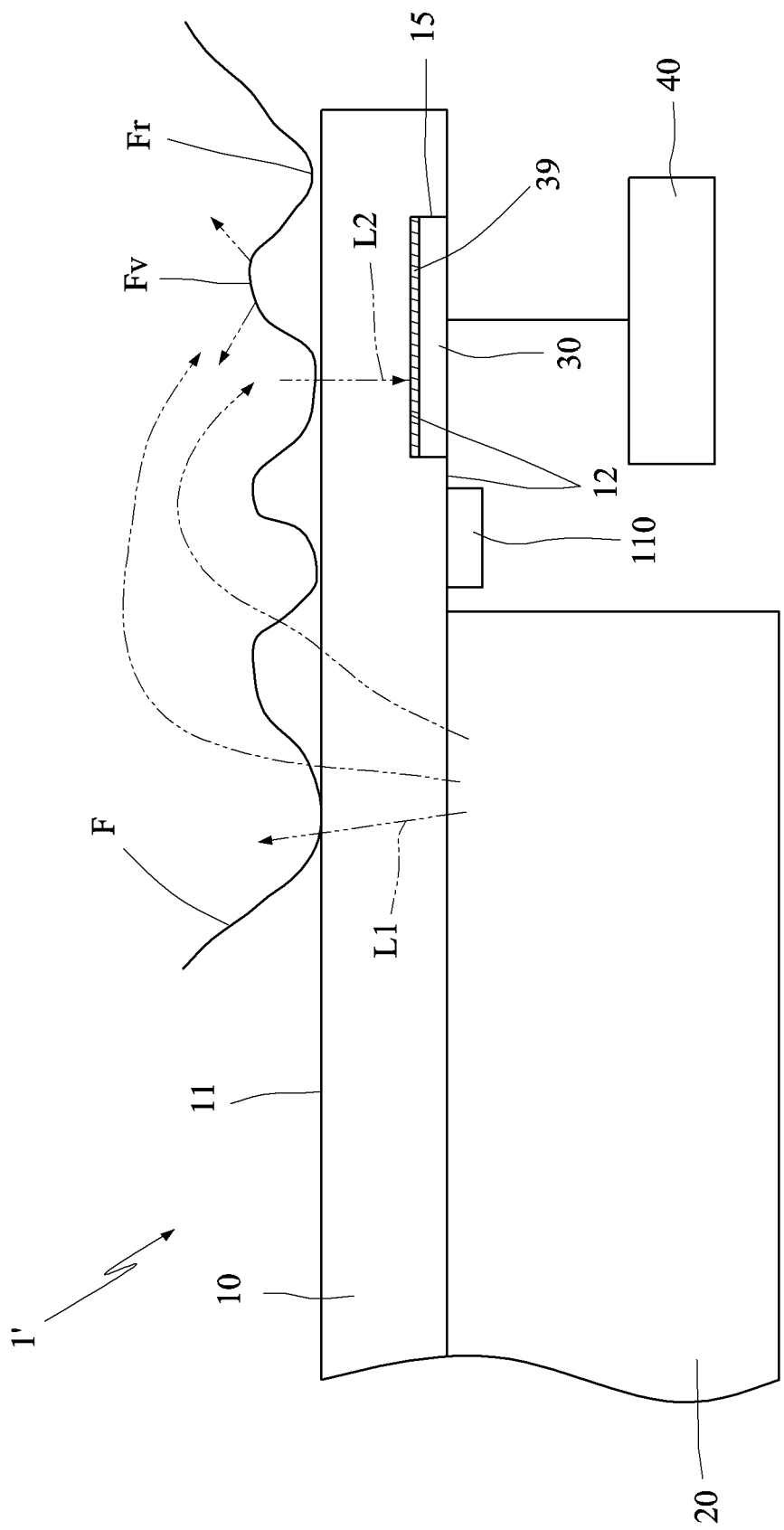
FIG. 5 is a schematic illustration showing a stray-light-coupled biometrics sensing module according to a second embodiment of the invention.

FIG. 5 is a schematic illustration showing a stray-light-coupled biometrics sensing module 1' according to the second embodiment of the invention. As shown in FIG. 5, the stray-light-coupled biometrics sensing module 1' of this embodiment is similar to the first embodiment except that the optical module 30 is embedded into one cavity 15 of the light-transparent body 10, so that the travelling distance of the second light rays L2 can be shortened, and the optical module 30 may also be protected from damage.

Figure 6:
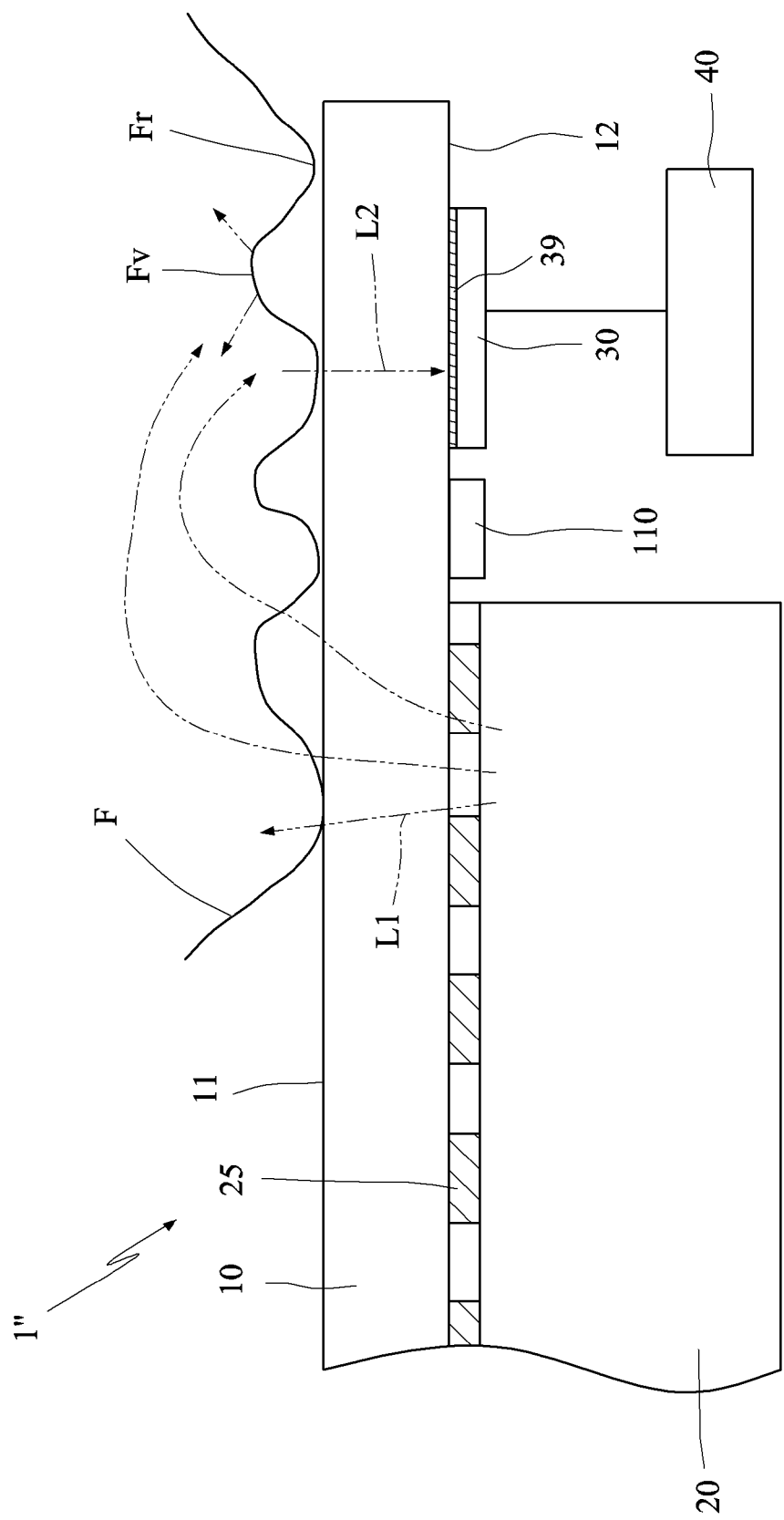
FIG. 6 is a schematic illustration showing a stray-light-coupled biometrics sensing module according to a third embodiment of the invention.

FIG. 6 is a schematic illustration showing a stray-light-coupled biometrics sensing module 1" according to a third embodiment of the invention. As shown in FIG. 6, the stray-light-coupled biometrics sensing module 1" of this embodiment is similar to the first embodiment except that the used display is a touch display. Thus, the backside 12 of the light-transparent body 10 is formed with multiple touch electrodes 25 in this embodiment, and the light-transparent body 10 and the display unit 20 constitute a touch display on which a user can perform the touch behavior to operate the electronic apparatus.

Figure 7:
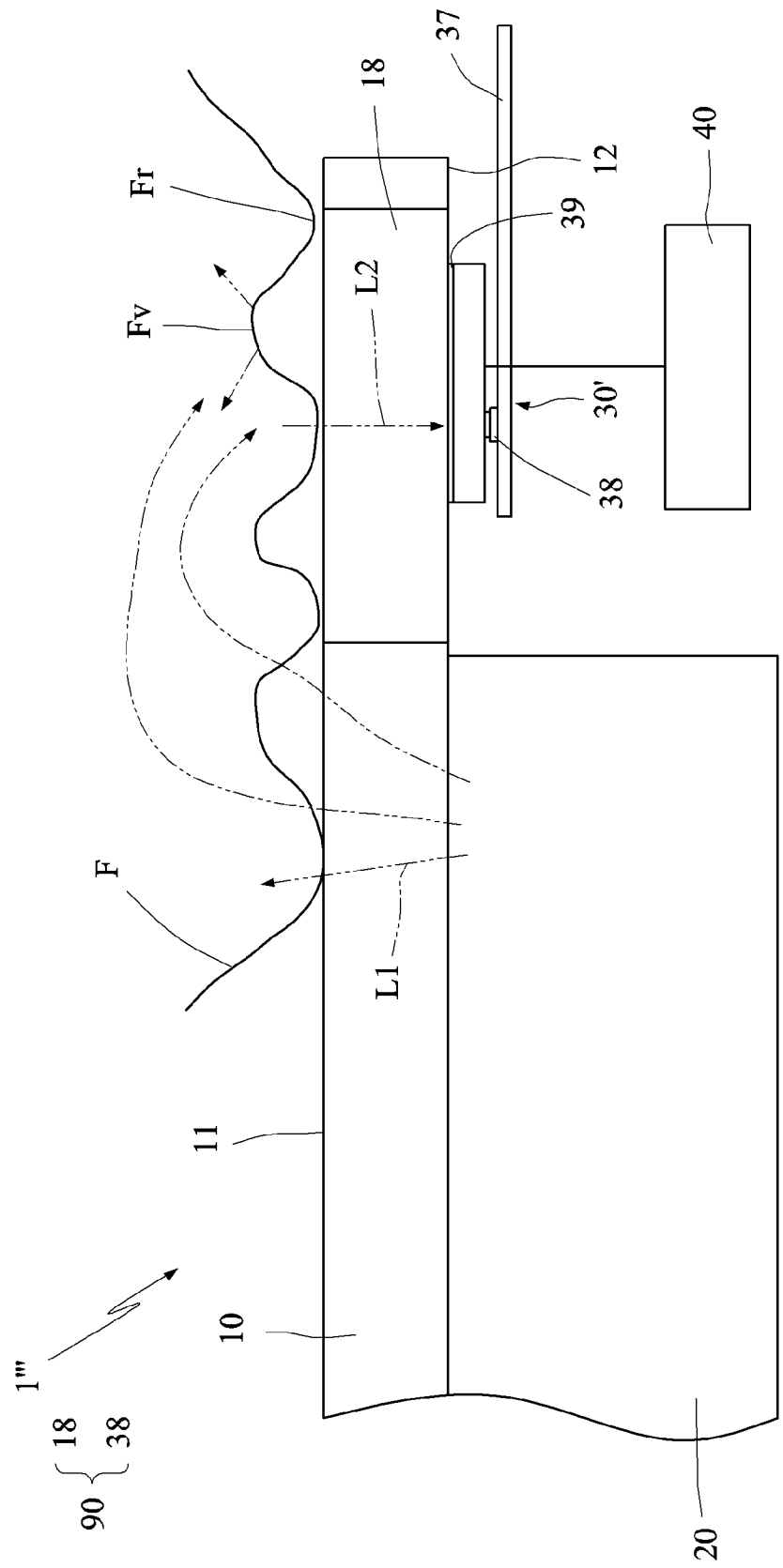
FIG. 7 is a schematic illustration showing a stray-light-coupled biometrics sensing module according to a fourth embodiment of the invention.

FIG. 7 is a schematic illustration showing a stray-light-coupled biometrics sensing module 1''' according to a fourth embodiment of the invention. As shown in FIG. 7, the stray-light-coupled biometrics sensing module 1''' of this embodiment is similar to the first embodiment, and the light-transparent body 10 includes a movable portion 18, which is movable up and down. The optical module 30' is attached to the movable portion 18 of the light-transparent body 10 through the adhesive 39 and includes a button switch 38 to be triggered by the movable portion 18 to provide a button function. The button function can control enabling and disabling of various software/hardware functions of the electronic apparatus. Thus, in this embodiment, the optical module 30' has the button function, and the movable portion 18 and the button switch 38 constitute a button similar to the button 90 of FIG. 2B. It is to be noted that the movable portion 18 of this embodiment and the light-transparent body 10 may be integrally formed with each other, and then separated by way of cutting, such as laser cutting. Alternatively, the movable portion 18 and the light-transparent body 10 are independently formed. Nevertheless, the movable portion 18 still may be regarded as one portion of the light-transparent body 10. The button switch 38 may be disposed on a flexible circuit board 37 electrically connected to the optical image sensor (see FIG. 4C) of the optical module 30', and the flexible circuit board 37 is also electrically connected to the control processing unit 40, thereby satisfying the wire layout of the electronic apparatus. Because this can be easily implemented by those skilled in the art after referring to the specification and drawings of the invention, detailed descriptions thereof will be omitted.

The user of the mobile phone has paid great attention to the outlook of the mobile phone. Many users cannot accept this design of mounting a sensor onto the housing of the mobile phone. The stray-light-coupled biometrics sensing module of the invention utilizes the light source of the display to couple the light into the finger, in which the light rays travel a short distance. If the sensor is placed beside the display, the light distribution conditions transferred from the finger's ridge and valley can be effectively sensed. Although the large-area sensor may also be used to sense the stationary finger's fingerprint, it is preferred to use an elongated sweep sensor to sense the fingerprint of the finger sliding thereacross.

According to the embodiments of the invention, it is possible to provide a stray-light-coupled biometrics sensing module and an electronic apparatus using the same, wherein the outlook of the electronic apparatus cannot be affected by the optical sensing module, and the user would not feel the depression or gap caused by the opening formed on the electronic apparatus when he or she is using the electronic apparatus. Using the optical fingerprint sensor to work in conjunction with the light source of the display can obtain the better sensing effect without additionally providing the light source for the optical fingerprint sensor. Consequently, it is possible to utilize the display to provide different wavelengths of light rays for the sensing of the stray-light-coupled biometrics sensing module.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A stray-light-coupled biometrics sensing module, comprising:
   a light-transparent body having a front side and a backside, wherein the front side is configured to support an organic object thereon;
   a display unit, which is attached to the backside of the light-transparent body and displays a frame;
   an optical module, which is attached to the backside of the light-transparent body through an adhesive, and is disposed adjacent to the display unit, wherein: first light rays of the frame couple into the organic object through the light-transparent body;
   after travelling a short distance in the organic object, the first light rays couple out of the organic object and become second light rays, which enter the optical module through the light-transparent body;
   the optical module senses the second light rays to generate a biometrics image signal; and
   a control processing unit, which is electrically connected to the display unit and the optical module, and controls operations of the display unit and the optical module,
   wherein the control processing unit controls the display unit to display frames, and the optical module generates multiple image signals according to different wavelengths of the first light rays of the frames, respectively.

2. The stray-light-coupled biometrics sensing module according to claim 1, wherein the display unit is a liquid crystal display unit or an organic light-emitting diode display unit.

3. The stray-light-coupled biometrics sensing module according to claim 1, wherein the backside of the light-transparent body is formed with touch electrodes, and the light-transparent body and the display unit constitute a touch display, on which a user performs touch behaviors.

4. The stray-light-coupled biometrics sensing module according to claim 1, wherein the control processing unit selects one of the image signals as the biometrics image signal.

5. The stray-light-coupled biometrics sensing module according to claim 1, wherein the control processing unit generates the biometrics image signal by performing optimization and mutual compensation on the image signals.

6. The stray-light-coupled biometrics sensing module according to claim 1, wherein the image signals comprise fingerprint image and finger vein image messages.

7. The stray-light-coupled biometrics sensing module according to claim 1, wherein the optical module comprises:
   a housing; and
   a first waveguide, a pupil, a second waveguide and an optical image sensor, all of which are disposed in the housing, wherein the second light rays sequentially travel through the first waveguide, the pupil and the second waveguide and enter the optical image sensor so that the biometrics image signal is generated.

8. The stray-light-coupled biometrics sensing module according to claim 1, further comprising:
   an invisible light source providing invisible light to the light-transparent body coupling into the organic object, contacting with the light-transparent body, through the light-transparent body to increase selectivity of sensing functions.

9. The stray-light-coupled biometrics sensing module according to claim 1, wherein the light-transparent body comprises a movable portion, the optical module is attached to the movable portion of the light transparent body through the adhesive, and the optical module comprises a button switch, to be triggered by the movable portion to provide a button function.

10. The stray-light-coupled biometrics sensing module according to claim 1, wherein a length of a sensing area on the light-transparent body is greater than or equal to $(2.54/x)*2$ centimeters, wherein x represents a resolution in a lengthwise direction of the length of the sensing area, and the resolution has an unit represented as dots per inch (dpi).

11. An electronic apparatus, comprising:
   a casing;
   a mainboard disposed in the casing; and
   the stray-light-coupled biometrics sensing module according to claim 1 connected to the casing, wherein the control processing unit, the display unit and the optical module are electrically connected to the mainboard.

12. The electronic apparatus according to claim 11, further comprising:
   a central processing unit, which is electrically connected to the mainboard and controls an operation of the control processing unit.

13. The electronic apparatus according to claim 11, further comprising:
   a storage device, which is electrically connected to the mainboard and stores data;
   a memory, which is electrically connected to the mainboard and temporarily stores data; and
   a power module, which is electrically connected to the mainboard and provides power.

14. The electronic apparatus according to claim 11, wherein the display unit comprises a bright region close to the optical module, and a brightness of the bright region is higher than a brightness of a region other than the bright region.

* * * * *